(No Model.) 6 Sheets—Sheet 1.
B. B. BADGER.
BOTTLING MACHINE.
No. 553,047. Patented Jan. 14, 1896.
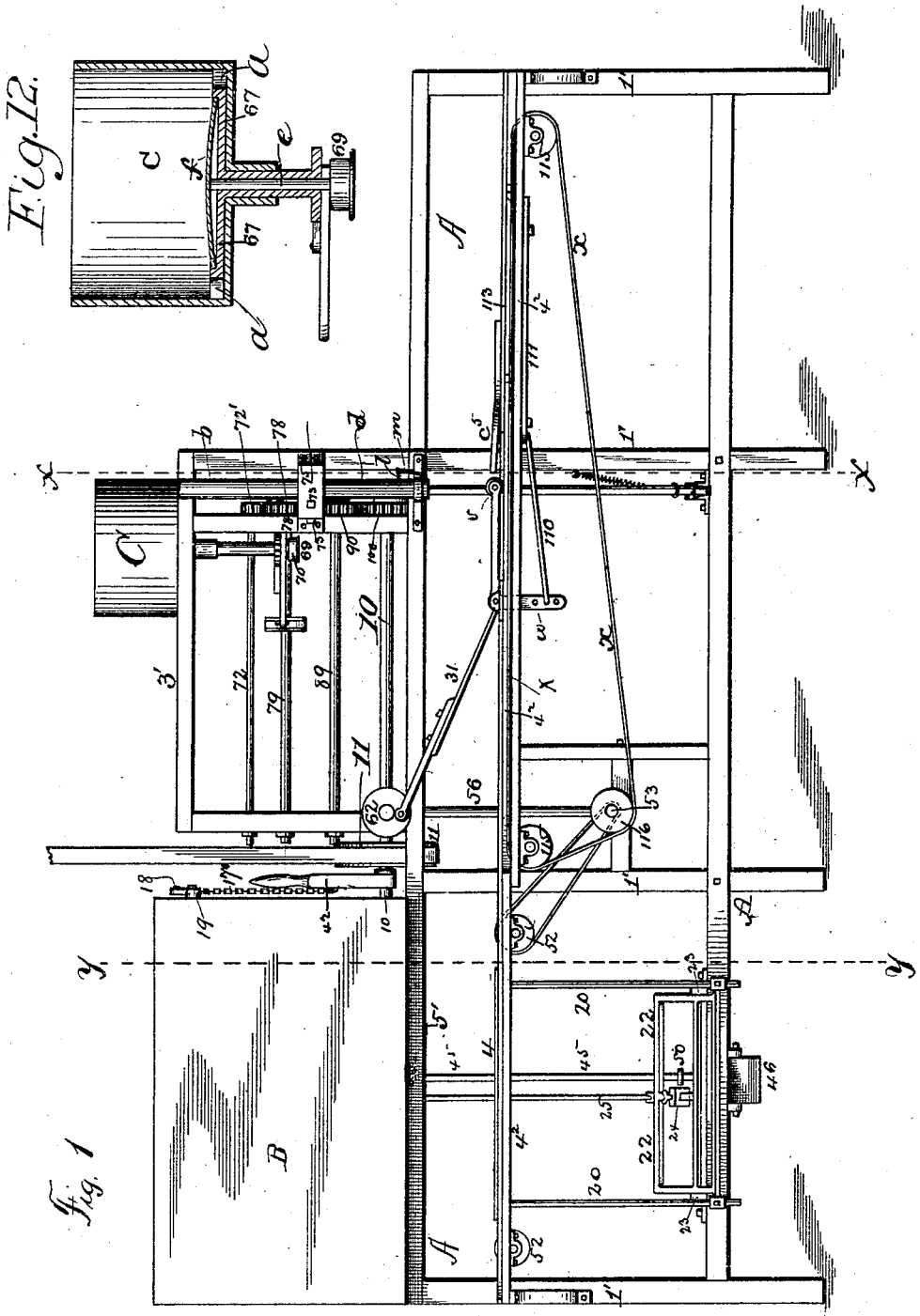
WITNESSES:
H. A. Carhart
Geo. M. Blowers.
INVENTOR.
Belden B. Badger
by
Smith & Remsen
ATTORNEYS (No Model.)  6 Sheets—Sheet 2.
B. B. BADGER.
BOTTLING MACHINE
No. 553,047.  Patented Jan. 14, 1896.
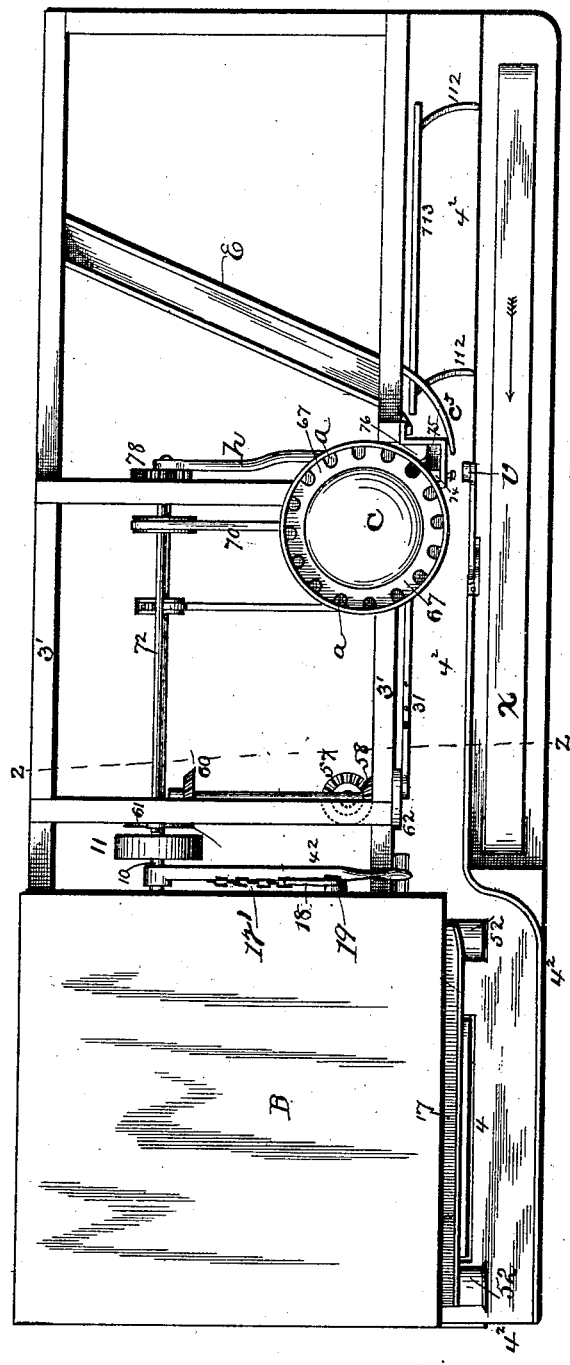
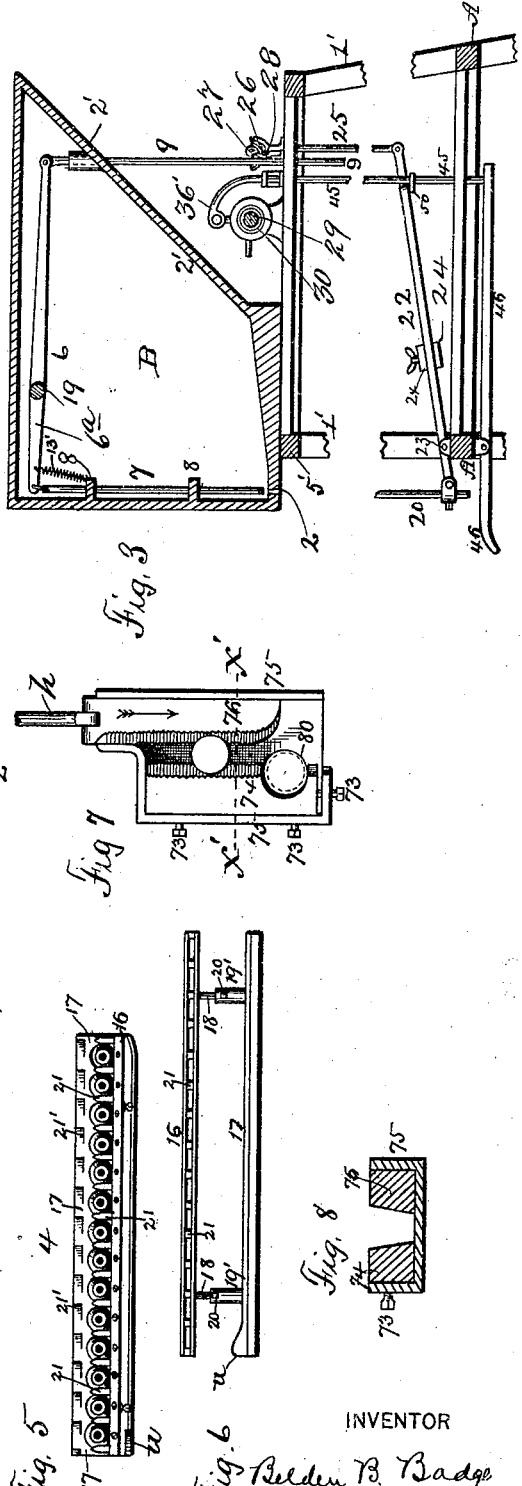
WITNESSES:
H. A. Carhart
Geo. M. Blivens
INVENTOR
Belden B. Badger
By Smith & Dennison
ATTORNEYS.

(No Model.)  
6 Sheets—Sheet 3.
B. B. BADGER.
BOTTLING MACHINE.
No. 553,047.  
Patented Jan. 14, 1896.
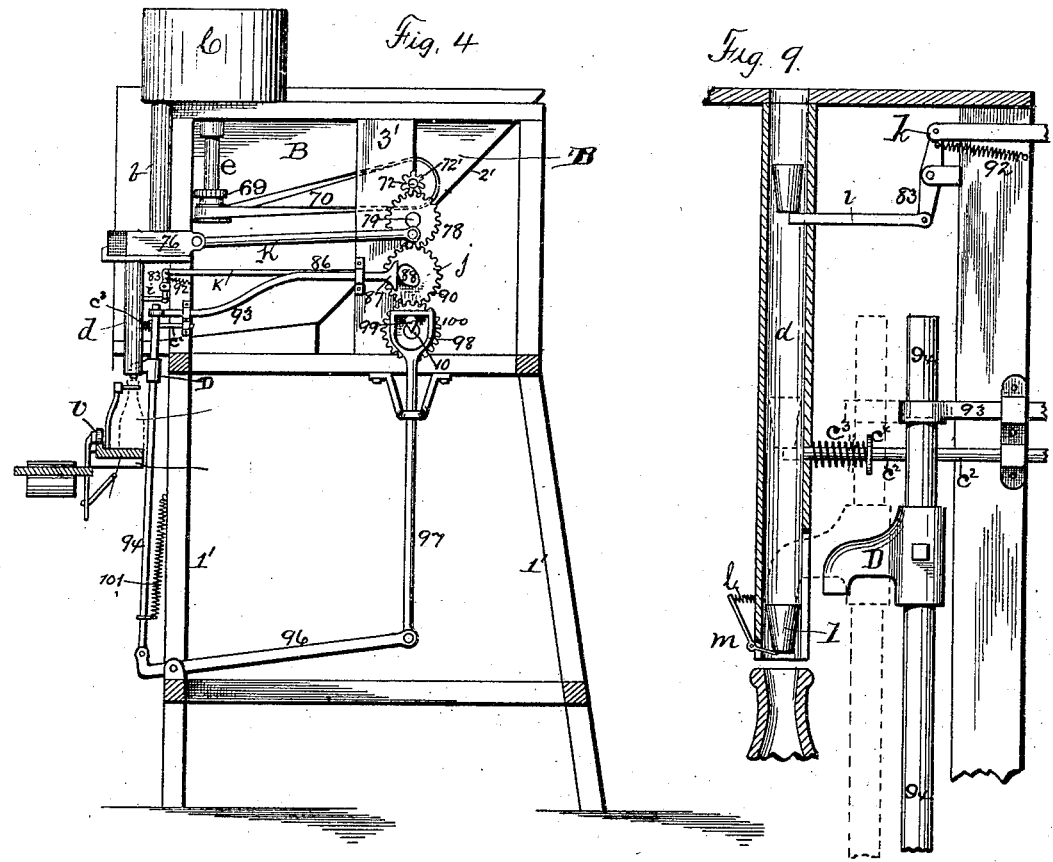
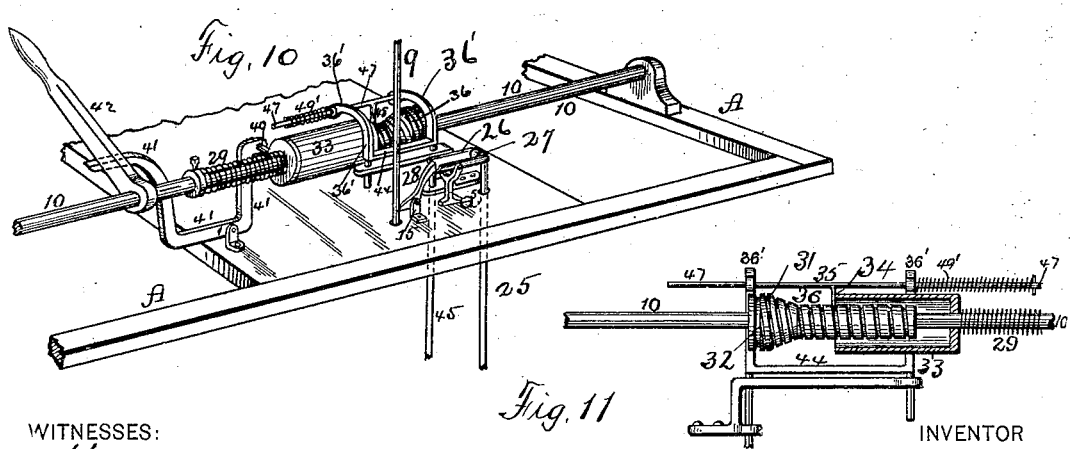
WITNESSES:  
H. A. Carhart  
Geo. M. Blivers
INVENTOR  
Belden B. Badger  
By Smith & Denison  
ATTORNEYS.

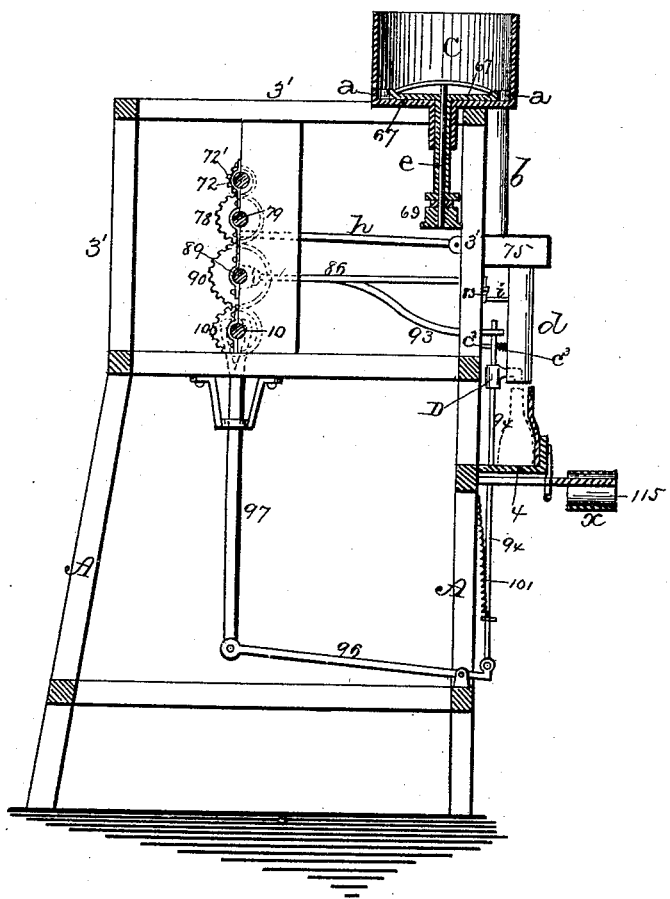

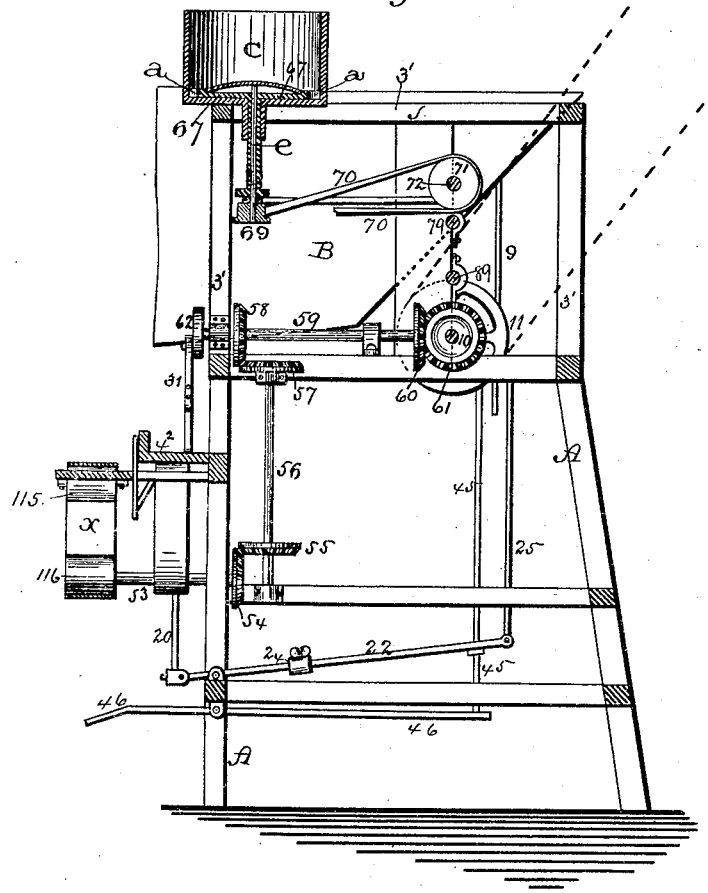

(No Model.) 6 Sheets—Sheet 6.
B. B. BADGER.
BOTTLING MACHINE.
No. 553,047. Patented Jan. 14, 1896.
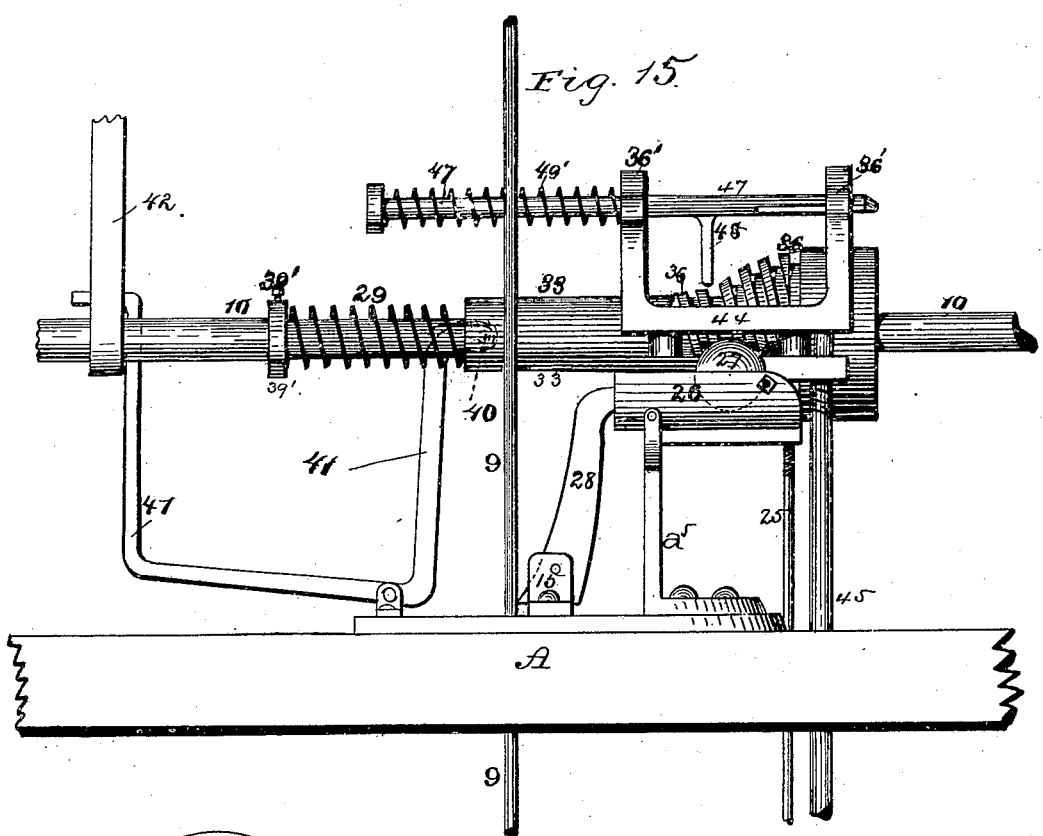
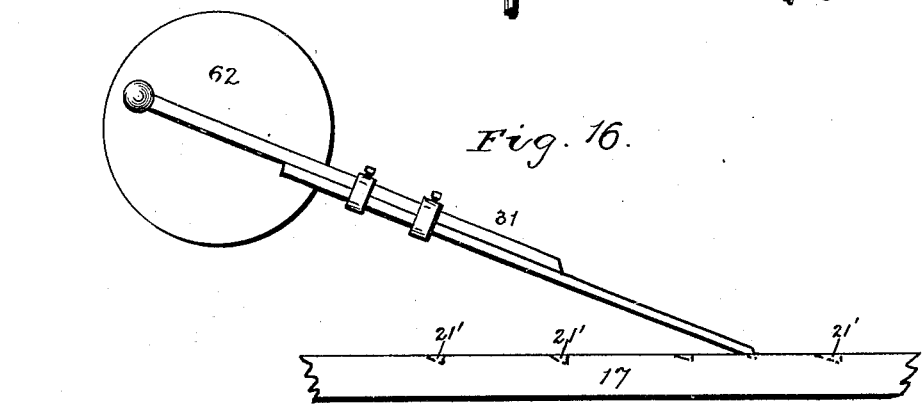
WITNESSES:
Chas. W. Marom.
E. S. Borst
INVENTOR
B. B. Badger
BY
Smith & Denison
ATTORNEYS.

UNITED STATES PATENT OFFICE.

BELDEN B. BADGER, OF OUAQUAGA, NEW YORK.

BOTTLING-MACHINE.

SPECIFICATION forming part of Letters Patent No. 553,047, dated January 14, 1896.

Application filed November 21, 1892. Serial No. 452,634. (No model.)

*To all whom it may concern:*

Be it known that I, BELDEN B. BADGER, of Ouaquaga, in the county of Broome, in the State of New York, have invented new and useful Improvements in Bottling-Machines, of which the following, taken in connection with the accompanying drawings, is a full, clear, and exact description.

My invention relates to improvements in bottling, filling, and corking machines, and the object of the invention is to provide a simple and compact machine by which bottles can be automatically filled with liquid, corked, and discharged into a delivery-chute.

With these objects in view the invention consists in the peculiar construction and arrangements of parts, as will be hereinafter fully described and pointed out.

In the accompanying drawings, which illustrate an embodiment of my invention, Figure 1 is a front elevation of a machine which embodies my invention complete. Fig. 2 is a plan view of the same. Fig. 3 is a transverse vertical sectional view on the line Y Y of Fig. 1. Fig. 4 is a similar view on the line Z Z of Fig. 2. Figs. 5, 6, 7, 8, 9, 10, 11, 12, and 16 are detail views of different parts of the machine. Figs. 13 and 14 are vertical cross-sections taken through the center of the cork-receptacle, but looking in the opposite directions. Fig. 15 is an enlarged detail view of the controlling mechanism.

In the drawings, in the different figures of which like letters and numerals of reference refer to corresponding parts, A designates the supporting-frame of the machine. This frame, which may be of any suitable material, size, and form, is preferably made in the form shown, and has mounted thereon, near one end, a supply tank or reservoir B, and at the other end is arranged the supporting-frame 3' of the corking mechanism. Along the front edge of the top of the main frame A extends a longitudinal guideway or shallow trough $4^2$, adapted to receive the racks or carriers in which the bottles are maintained during the filling and corking operations.

The tank or reservoir B is raised or elevated somewhat above the top of the frame A, being mounted upon a base-piece 5', and so arranged that it partially overhangs the guideway $4^2$. This tank is preferably made of the form shown, with its rear wall 2' inclined or sloping outwardly from its bottom to its top, and in that portion of the bottom which extends over the guideway $4^2$ are formed a series of discharge-openings 2. These openings are normally closed by vertically-movable valve-rods 7, which extend loosely through guides or eyes 8, attached to the front wall of the tank, and each of which is connected at its upper end to one of a series of arms $6^a$, carried by a rock-shaft 19, that is journaled in the end walls of the tank, near the upper end thereof. The rock-shaft 19 is also provided with a rearwardly-extending arm 6, the rear end of which is connected to the upper end of a rod 9, that extends through the inclined rear wall 2' of the tank B, and by means of which the valve-rods can be raised to open the discharge-openings 2.

The valve-rods or plungers 7 are normally maintained in their lowermost positions with their lower ends closing the discharge-openings 2 by means of coiled springs 13', corresponding in number to the valve-rods, one end of each of which springs is connected to one of the guides or eyes 8, and has its other end connected to the arm $6^a$, by which the particular plunger is operated.

When the discharge-openings 2 are opened, the plungers 7 are maintained in an elevated position during the time that a number of bottles, corresponding in number to the discharge-openings, are being filled from the tank or reservoir B by gravity-locking lever 28, which is fulcrumed at 15 upon a suitable stud on the top of the frame A. The forward end of this locking-lever is preferably grooved or recessed to partially surround or receive the plunger-operating rod 9, and as the rear portion of such lever is weighted or made heavier than the portion in front of the fulcrum such rod 9 is held rigidly in its lowered position and the plungers maintained in an elevated position when the lever 28 occupies the position shown in Fig. 10, and while such rod is engaged by the lower forward end of said lever.

The bottles to be filled are carried by or supported on a car or carrier which consists of a base-plate 17 and a vertically-adjustable guide-frame or holder 16. This frame is provided with two or more depending rods 18, which extend into tubular posts or uprights 19' on the base-plate of the carrier, and are held at any desired position therein by means of set-screws 20. The necks or upper ends of the bottles in the car extend between and are held against lateral movement by a series of paralleled horizontal fingers or pins 21, carried by the vertically-adjustable frame 16.

In the upper face or surface of the base-plate 17 of the bottle-carrier, adjacent to the inner longitudinal edge thereof, are formed a series of recesses or notches 21', adapted to successively receive the free end of the pitman 31, which will be hereinafter more fully described, and by which said car is advanced step by step from the filling mechanism to the corking apparatus of the machine. The said base-plate 17 of the bottle-carrier is also provided on its upper surface, near its rear end and adjacent to its outer edge, with a cam-shaped lug or ear $u$.

During the time that the bottles carried by the carrier, just described, are being filled such carrier is supported on a vertically-movable support or plate 4, which is carried by rods 20, the lower ends of which are connected to ends of the front bar of a frame 22 fulcrumed to angle-irons 23 attached to the main supporting-frame A of the machine. The plate 4 is adapted to move freely through a slot or passage formed in top of the main supporting-frame below the overhanging or projecting portion of the tank or reservoir B, and the fingers 21 of the bottle-carrier are so arranged and said carrier is of such a length that one of the bottles is held below and in line with each of the supply-openings 2 in said tank. The plate 4 is maintained above the surface of the guideway $4^2$, and the upper ends of the bottles are pressed close against the bottom of the tank B during the filling operation by means of a weight or weights 24, secured on the pivot-frame 22, to which the rods 20 are connected, on the opposite side of the fulcrum thereof from the points of connection of said rods. In the embodiment of my invention herein shown, a single weight 24 is mounted upon a central longitudinal rod of said frame, and the weight 24 is adjustable to and from the pivotal points of the pivoted frame in order that they may be properly adjusted thereon to counterbalance the weight of the bottle-carrier and its contents, and enable bottles of different weights to be filled. Such weight is so proportioned and arranged as to balance the weight of the bottle-carrier and the bottles thereon when the latter have been filled.

The pivoted frame is connected at its rear end to the lower end of a rod 25, which extends up through the top of the main frame A, and is connected at its upper end to one end of a short rocking holder or guide 26, pivoted on a suitable support 25 on top of the main frame. This holder 26 is arranged in the same longitudinal line as the rocking lever 28, before described, and the upper rear weighted end of said lever extends over the open end of such holder. Within said holder or guide is arranged a release-ball 27, which when the rear end of the holder is elevated by the rocking of pivoted frame 22, by which the bottle-carrier is supported, falls by gravity against the upper end of the locking-lever, causing it to turn on its fulcrum and thereby releasing the rod 9 from the lower end thereof, and permitting the springs 13' to draw down the plungers 7 and close the valves or openings 2 in the tank B.

In suitable journals or bearings on the frame A is mounted the main power-shaft 10 of the machine. On the shaft is secured a suitable driving-pulley 11, designed to be connected by means of an endless belt with the driving-wheel of an engine or other motor. On the shaft 10, in the rear of the tank or reservoir B, is secured to rotate therewith a threaded or spirally-grooved cone 36. This cone is partially covered by a longitudinally-movable sleeve 33, which is normally held over said cone by a spiral spring 29, fitted around the shaft 10, between the closed end of said sleeve and a collar 39'. To a laterally-projecting ear 40 on the sleeve 33 is attached one end of a lever 41, fulcrumed to the top of the main supporting-frame A, and having a portion thereof extending below and transversely across an arm or lever 42 on the shaft 10.

36' designates two parallel curved arms which extend partially around and over the threaded cone 36, and which are connected at their lower ends by a bar 44. This bar 44 is connected to the upper end of a rod 45, which extends through the top of the supporting-frame A, and is connected at its lower end to one end of a foot-treadle 46. In aligned openings formed in the curved arms 36', near the forward ends thereof, is fitted a longitudinally-movable rod 47, which is provided at a point between said arms 36' with a depending finger or pin 48, adapted to travel in the spiral grooves in the cone 36. On the rod 47 between one of the enlarged heads thereof and one of the arms 36' is arranged a coiled spring 49'. The rod 45 is provided near its lower end with a laterally-projecting finger 50, which extends below the rear end of the frame 22 to which the release-rod 25 is connected.

The lever 42 is connected by a chain, link, or suitable means 17' with an arm 18, secured on one end of the rock-shaft 19 beyond the tank or reservoir B, so that by drawing down on such lever the operator can rock such shaft and thereby raise the plungers or valve-rods 7 and permit the bottles held below the openings 2 to be filled. At the same time that the plungers 7 are being raised the lever 42, by contact with the lever 41, near the free end of the latter, withdraws the longitudinally-movable sleeve 33 from below the pin 48, where it is normally maintained by the action of the springs 29 and 49', and such pin would at once descend sufficiently to cause its lower end to enter the spiral groove in the cone 36, were it not held just above such groove by the operator depressing slightly the treadle 46.

When the bottles below the openings 2 have been filled the weight of the carrier and its load is sufficient to balance the weight or weights 24. Then by removing the pressure from the foot lever or treadle 46 the finger 48 is allowed to enter the spiral groove in the cone 36, and as it is raised upwardly and moved longitudinally thereby the finger 50, carried by the rod 45, raises the rear end of the pivoted frame 22, and instantly through the action of the rod 25 and gravity releasing-ball 27 releases the rod 9 and permits the springs 13' to draw down the plungers 7 and close the openings 2. Further upward movement of rod 45 rocks the pivoted frame to a greater extent and causes the base-plate 16 of the bottle-carrier, which is of greater length than the plate 4, to rest on driving-rollers 52, which are journaled in the bottom of the guideway 4 of the machine. One of these rollers 52 is belted to a pulley on a transverse shaft 53, journaled in suitable bearings on the main frame A, below the top thereof. On said shaft is secured a bevel-pinion 54, which meshes with a similar pinion 55 on a vertical shaft 56. On the upper end of the shaft 56 is secured another beveled gear 57, that meshes with a corresponding gear-wheel 58 on a horizontal shaft 59. This shaft 59 carries at one end a bevel-gear 60, that meshes with a corresponding gear 61 on the main driving-shaft 10 of the machine. On the opposite end of the shaft 59 from the bevel-gear 60 is secured a crank-disk 62, to which is eccentrically connected one end of the pitman 31. As the base of the bottle-carrier comes upon the driving-roller 52, it is advanced forward along the guideway 4² by frictional contact with such roller sufficiently far to enable the lower free end of the pitman 31 to successively enter the notches 21' in the base of the bottle-carrier and advance such carrier and its load of filled bottles step by step below the corking mechanism which will now be described.

C is a cork-supply receptacle which is mounted upon the framework 3' at one side of the filling apparatus just described. In the bottom of the cork-receptacle C there is formed an opening which aligns with the upper end of a short vertical tube $b$ that serves to conduct corks from such receptacle to the corrugating devices. Within said cork-receptacle is arranged a distributing-plate 67, which is provided with a series of peripheral notches $a$, each adapted to receive a cork and maintain it in an upright position which successively align as said plate is revolved, with the opening in the bottom of the receptacle C, and allow the corks therein to pass by gravity into the conveyer-tube $b$. The distributing disk or plate 67 is provided with a central depending shaft $e$, which extends through a suitable sleeve or bushing on the receptacle C and is provided near its lower end with a driving-pulley 69. Motion is imparted to the pulley 69, shaft $e$ and cork-distributing plate 67 through a drive-belt 70, passing around said pulley and over a pulley or band-wheel 71 on a shaft 72, that is geared to the main driving-shaft 10, as will be hereinafter described. The corks successively pass from the tube $b$ and fall between the stationary and the sliding portions of the corrugating device. This corrugating device consists of a stationary horizontal frame 75, arranged below and extending transversely across the lower end of the tube $b$. Within such frame is firmly but detachably held by means of set-screws 73 a plate 74 having its inner longitudinal edge provided with a series of vertical grooves or corrugations. Within the frame 75, at one side of the stationary plate 74, is arranged a longitudinally-movable slide plate or bar 76, the inner edge or face of which is provided with a series of vertical grooves or corrugations similar to those on the inner edge of the stationary plate 74. The sliding bar 76 is connected to one end of the pitman $h$, the other end of which is eccentrically secured to the outer face of the gear-wheel 78 on one end of the shaft 79, and meshing with a pinion 72' on the shaft 72.

As shown in the drawings, the tube $b$ delivers the cork to the space between the corrugating-plates 74 76, near the inner or rear ends thereof, and by the forward movement of the bar 76 the cork is moved forward, being corrugated longitudinally during such movement, and into a recess or notch 80, formed in the inner face of the plate 74, and aligning with the upper end of the delivery-tube $d$. The corrugated cork falls by gravity into the tube $d$, and is held therein, a short distance from the upper end thereof, by a laterally-movable stop plate or arm $i$. This arm $i$ is connected at its rear end to one end of a lever 83, fulcrumed on an ear or lug carried by one of the supports of the corking mechanism. The other end of the lever 83 is connected to the forward end of an arm $k$ of a longitudinally-reciprocating rod 86, which extends through suitable guides and is provided at its rear end with an enlarged head 87, against which a cam 88, secured on a shaft 89, acts to force said rod 86 forward. The shaft 89 is provided with a gear-wheel 90, that meshes with the gear-wheel 78 on the shaft 79. When the rod 86 is thus moved forward by the cam 88, the lever 83 is rocked on its fulcrum and the stop plate or arm $i$ is withdrawn from the tube $d$, and the cork formerly held suspended by such plate falls until it comes in contact with another stop plate or pin $m$, which has been automatically advanced through an opening into the tube $d$. As the head 87 is released from the pressure of the cam 88, the plate $i$ is again advanced into the tube $d$ by the action of a coiled spring 92. The other arm 93 of the rod 86 extends through suitable guides, and in said arm near its free end is formed an opening or passage through which extends a vertically-movable rod 94, which carries the cork-driving finger D into the mouths of the previously-filled bottles as the same are successively brought below and in line with said tube by the action of the pitman 31, before described. The lower end of the rod 94 is pivotally connected to one end of the lever 96, fulcrumed on the main frame A, and to the other end of such lever is pivotally connected a rod 97, which is provided at its upper end with an enlarged apertured or slotted head 98, within which works a cam 99, secured on one end of the main driving-shaft 10. On the shaft 10, at one side of the cam 99, there is secured a gear-wheel 100, which meshes with the aforementioned gear 90, and by which power from the main shaft is communicated to the various parts of the corking apparatus. A coiled spring 101 pulls the forward end of the lever 96 up whenever the cam 99 is not acting on the rod 97. The stop-pin $c^2$ extends loosely through guides on the supporting-frame of the corking apparatus, and is normally held in position outside of the tube $d$ by means of a coiled spring $c^3$ fitted around it between a collar $c^4$ on the pin and the side of the tube. The said collar projects laterally from the pin $c^2$ sufficiently far to be in the forward path of the rod 94 (see Fig. 9) as the same is moved forward by the cam 88, and such stop pin or arm $c^2$ is thereby pushed into the tube $d$ and acts to momentarily stop the downward passage of the cork which is released from the stop $i$ by the same forward movement of rods 86 and $k$. As the rod 94 is withdrawn by action of the spring 101 and the stop $c^2$ is withdrawn from the tube $d$ the cork previously held thereby falls to the lower end of said tube and rests upon and is supported by one arm of a lever $m$, fulcrumed on the tube $d$, and having interposed between its other arm and said tube a coiled spring $l$. At the next forward movement of the rod 94, under the influence of the cam 88, acting on the rod 86, movement of the stops $i$ $c^2$ is repeated, and the driving-finger D enters the tube $d$ through a slot therein and projects over the cork at the lower end thereof. While the parts are in this position the cam 99 acts to raise the rod 97, thereby drawing down the rod 94 and forcing the cork from the tube $d$ into the mouth of the bottle held below the tube, the lever $m$, yielding to such pressure of the driver D by instantly returning to its former position by action of the spring $l$ as the driver is withdrawn from the tube. As the filled bottles are successively corked and the carriage is advanced such corked bottles are removed therefrom by means of a stationary curved plate, bar, or finger $c^5$, which as the carriage advances pushes the bottles therefrom by and into an inclined guide E. A bell-crank lever $w$ is pivoted to the main supporting-frame A, and one arm thereof carries at its free end a roller $v$. The other arm of such bell-crank lever is connected by means of a link 110 with a longitudinal bar or rod 111. This rod is connected near its ends by means of pins that extend through curved slots 112 in the bottom of the guideway 4 of the machine to a similar bar 113 arranged within said guideway. As the bottle cam or carriage is advanced and the bottles are corked and removed therefrom, the cam lug or ear $u$ comes under the roller $v$ and rocks or turns the bell-crank lever $w$ on its pivot. The lower end of the arm of such lever is thus thrown forward, which movement causes the bars 111 113 to move transversely across the guideway $4^2$, and the carriage from which the bottles have been removed having been advanced to a position adjacent to said bar 113, is thereby moved laterally upon an endless belt $x$ that passes around pulleys 115 journaled in bearings on the main frame A and a driving-pulley 116 carried by the shaft 53.

What I claim is—

1. In a machine for the purpose described, the combination of a supply tank or reservoir provided with outlets, a plunger arranged within the tank, a rock shaft journaled in the end walls of the tank, and connected with the plunger therein, a plunger operating rod connected with said rock shaft and extending through one of the walls of the tank, a vertically movable support adapted to hold a bottle in line with the outlet in the tank, and connections between said support and the plunger operating rod, whereby the latter will be automatically operated to close the outlet in the tank when the bottle thereunder has been properly filled, substantially as set forth.

2. In a machine of the character described, the combination with a supporting frame having a longitudinally extending guide way formed in its top, of a supply tank supported on said frame and overhanging said guideway, said overhanging portion of the tank, having formed therein a series of outlets, a series of valve rods arranged within the tank and adapted to close the outlets thereof, a rock shaft journaled in opposite walls of the tank and connected with the valve rods or plungers therein, a plunger operating rod connected with said rod and extending through one wall of the tank, a lock or fastening for holding said rod against movement and which maintains the valve rods or plungers in an elevated position, a vertically movable support adapted to work through an aperture or slot in the guide way on the supporting frame and maintain a series of bottles below the overhanging portion of the tank, and connections between said support and the locking device for the plunger operating rod whereby such rod will be automatically released and the outlets in the tank closed when the bottles on the vertically movable support have been properly filled, substantially as shown and described.

3. In a machine for the purpose described, the combination with a supporting frame, a tank mounted thereon, and provided with an outlet, a valve therein, and a valve operating rod extending through one wall of the tank, of a locking lever fulcrumed on the supporting frame and adapted to engage at one end with said plunger operating rod, a pivoted frame arranged below the tank, a bottle support carried by said frame on one side of its pivot and adapted to hold a bottle in position to be filled from the outlet in the tank, and a rod connected at one end to said frame, on the opposite side of its pivot from the bottle support, and having its other end connected with means for releasing the plunger operating rod from its locking position, substantially as shown and described.

4. In a machine for the purpose described, the combination with the tank provided with an outlet valve, and a valve operating rod extending through one wall of the tank, of means for locking said valve operating rod against movement, a frame pivoted beneath the tank, a bottle holder carried by said frame on one side of its pivot and adapted to hold a bottle in position to be filled from the tank, a rod having one end connected to said frame, on the opposite side of its pivot from the bottle support, and its other end connected with a mechanism for releasing the valve rod from its locking means, a power shaft, having secured thereon a threaded cone, a foot lever or treadle, and a rod connected to said treadle and carrying at its upper end a pin or finger adapted to travel in the grooves or threads in the cone on the power shaft, and at some intermediate point of its length, a finger or arm that extends under the said pivoted frame, substantially as shown and described.

5. The combination with the tank, provided with an outlet, a valve therefor, and a valve operating rod, of means for holding said rod stationary to maintain the valve open, a pivoted frame arranged below the tank, a bottle support carried by said frame and adapted to hold a bottle in position to be filled from the tank, a weight adjustably secured on said frame on the opposite side of its pivot from the bottle support, with devices for releasing the valve operating rod from its locking means, a power shaft having a spirally grooved cone secured thereon, a spring pressed sleeve normally covering a portion of said cone, and operating lever fulcrumed on said power shaft, a retracting lever having one end connected to said spring pressed sleeve, and its free end extending across the path of the operating lever, a foot treadle and a rod connected to said treadle and carrying at its upper end a depending finger adaped to travel in the grooves in the cone on the power shaft, and at an intermediate point of its length, a finger or arm that extends laterally beneath the pivoted frame aforesaid, substantially as shown and described.

6. In a machine of the character described, the combination with a tank provided with an outlet, a valve therefor, and a valve operating rod, of means for holding said rod stationary to maintain the valve open, a pivoted frame arranged below the tank, a bottle support carried by said frame and adapted to hold a bottle in position to be filled from the tank, a weight adjustably secured on said frame, a rod having one end connected to said frame, on the opposite side of its pivot from the bottle support, and its other end connected with devices for releasing the valve operating rod from its locking means, a power shaft having a spirally grooved cone secured thereon, a spring pressed sleeve normally covering a part of said cone, an operating lever fulcrumed on said power shaft, a retracting lever having one end connected to a spring pressed sleeve, and its free end extending across the path of the operating lever, a foot treadle, a rod connected to said treadle and having at its upper end the paralleled curved bars 36', and at an intermediate point of its length, a finger or arm that extends beneath the pivoted frame aforesaid, and a longitudinally movable rod extending through aligned passages in the curved bars 36' and provided with a depending finger in the grooves in the cone on the power shaft, substantially as shown and described.

7. In a machine for the purpose described, the combination with the tank provided with an outlet, of a valve rod connected to a rock shaft journaled in opposite walls of the tank, and connected with said valve rod, one end of the shaft projecting beyond the tank, a valve operating rod connected to the rock shaft and extending through one wall of the tank, means for holding said rod stationary, a pivoted frame carrying at one end a bottle support and at its other end a rod which is connected with devices for releasing the valve operating rod from its lock, a power shaft having secured thereon a spirally grooved cone, an operating lever fulcrumed on the power shaft, and connected with the projecting end of the rock shaft in the tank, a spring pressed sleeve adapted to partially cover the grooved cone on the power shaft, a retracting lever having one end connected to said sleeve and its other end extending into the path of the operating lever, a foot treadle, and a rod connected to said treadle, and having at its upper end a movable depending finger adapted to catch in the grooves in the cone on the power shaft and at an intermediate point of its length, with a laterally projecting finger or arm that extends beneath the pivoted frame aforesaid, substantially as described.

8. In a machine for the purpose described, the combination with a supporting frame, having a longitudinal guide way, a filling apparatus arranged near one end of said frame adjacent to the guide way thereof, and a corking apparatus arranged at one side of the filling apparatus, of a bottle carrier having a series of notches or sockets formed in its body, a power shaft journaled in bearings on the supporting frame, a friction driving roller arranged in the guide way of said frame, in front of the filling apparatus, and adapted to contact with and advance the bottle carrier along said way, a counter shaft geared to the main shaft and provided at one end with a disk, and a pitman pivoted to said disk and adapted to have its free end take into the notches or sockets in the body of the bottle carrier to advance said carrier past the corking apparatus, substantially as set forth.

9. In a machine for the purpose described, the combination with a supporting frame having a longitudinal guide way, a filling apparatus arranged near one end of said frame adjacent to the guide way thereof, and a corking apparatus arranged at one side of the filling apparatus a power shaft, a bottle carrier fitted to move on the guide way in the supporting frame and provided near one end with a cam lug or ear $u$, means for advancing the bottle carrier along the guide way from the filling to the corking apparatus, a stationary finger for removing the bottles from the moving carrier, a bell crank lever fulcrumed on the supporting frame, and having one arm provided with roller lying in the path of the cam on the bottle carrier, connections between the other arm of such lever, and a laterally movable slide in the guide way of the supporting frame and having one arm of such lever and a laterally movable slide in the guide way of the supporting frame, and an endless belt arranged at one side of said guide way serving to return the empty bottle carrier to the filling apparatus, substantially as set forth.

In witness whereof I have hereunto set my hand this 14th day of September, 1892.

BELDEN B. BADGER.

In presence of—
HOWARD P. DENISON,
C. B. KIMEL.